May 13, 1958     W. E. TOLLES     2,834,939

COMPENSATION OF INDUCED MAGNETIC FIELDS

Filed July 31, 1944

Inventor
WALTER A. TOLLES

United States Patent Office 2,834,939
Patented May 13, 1958

2,834,939

COMPENSATION OF INDUCED MAGNETIC FIELDS

Walter E. Tolles, Mineola, N. Y., assignor to the United States of America as represented by the Secretary of the Navy Application July 31, 1944, Serial No. 547,447

2 Claims. (Cl. 324—43)

This invention relates to compensation systems, and more particularly to methods of and means for compensating the induced magnetic fields of aircraft.

When aircraft are equipped with portable magnetometers or other mgnetic instruments dependent for their operation upon measurement of a magnetic field component in a chosen direction, as for example in the direction of the earth's magnetic field, the operation of such instruments may be greatly impaired by magnetic fields induced in soft magnetic members of the aircraft structure. In general, such induced fields have components in the direction chosen for the measuring instruments, and consequently cause the measuring instruments to produce spurious outputs which may entirely mask outputs due to the quantities desired to be measured. Thus, for example, when a portable magnetometer is oriented continuously in the direction of the earth's magnetic field and is used for the detection, from the air, of magnetic objects, magnetometer outputs due to variations in the induced field of the aircraft as it maneuvers may be equal to or considerably greater than outputs due to the magnetic objects to be detected.

A consideration of the type of induced field to be found in an aircraft, the structure of which includes soft ferromagnetic members, indicates that the component of total induced field in the direction of the earth's magnetic field is relatively complex in nature. This component depends upon two things: first, upon the relative orientations of the various soft magnetic members in which fields are induced and the earth's magnetic field, this determining the magnitude and type of variation of the total induced field; and second, upon the relative orientation of the total induced field so produced and the direction in which magnetometer measurements are to be made. Since soft magnetic members in an aircraft structure may have almost random distribution, it will be recognized that as the aircraft maneuvers the component of total induced field in the direction of the earth's magnetic field varies in a complex fashion.

Heretofore, aircraft compensation for induced magnetic fields has been limited to cases in which the total induced field is due wholly or predominantly to the field induced in a member or members of a single known orientation. One device for this purpose is disclosed in copending application Serial No. 547,448, filed July 31, 1944, Induced Magnetization Compensator, Wilmer C. Anderson and Robert I. Strough. This device includes a magnetometer arranged to be oriented in the direction of the member causing the induced field and to measure variations in the field in that direction, and means for applying the output of the magnetometer to a compensating coil in such fashion as to produce a field opposing the field of that member. The use of such a device in the general induced compensation case would entail determination of the orientation of each member contributing to the total induced field and the provision of a multiplicity of the compensation devices, each of which would have to be adjusted individually to balance out the contribution of a particular member or group of members. In view of the fact that in the general case the distribution of members causing an induced field is unknown, such a system of compensation would be impracticable if not impossible.

Objects of the present invention are, therefore, to provide a method whereby the total induced magnetic field of an aircraft may be determined and compensated without previous knowledge of the distribution and orientation of the members in which the field is induced, and to provide means for carrying out this method of compensation which requires the initial adjustment of a relatively small number of parameters, and which thereafter operates automatically to compensate the induced magnetic fields of the aircraft as it maneuvers.

Accordingly, the invention provides in one aspect a method of induced magnetic field compensation for aircraft equipped with portable magnetometers arranged to measure magnetic field components in the direction of the earth's magnetic field, which includes choosing a set of reference axes in respect to the aircraft; maneuvering the aircraft in such manner that a component along one of these axes of the total induced magnetic field will produce an identifiable contribution to the output of the magnetometer; producing a magnetic field along the last-mentioned axsi and opposing the component thus identified, this magnetic field having a magnitude and varying in a manner such that that component is effectively reduced to zero; and thereafter performing a second maneuver and repeating the compensation process until each of the components of the induced field is in turn effectively reduced to zero.

In another aspect, the invention provides an induced magnetic field compensator for aircraft equipped with magnetometers arranged to measure field components in the direction of the earth's magnetic field, which comprises means for measuring components of the earth's magnetic field in two mutually perpendicular directions in respect to the aircraft, means for producing voltages proportional to field components in these directions, coils for generating magnetic fields in each of these directions, a third coil for generating magnetic fields in a direction normal to each of these directions, and means for applying currents proportional to these voltages in individaully adjustable magnitudes and polarities to each of the coils.

The above and other features of the invention will be described in the following detailed specification and pointed out in the appended claims.

Figure 1:
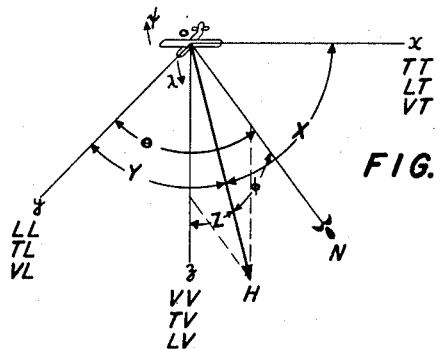
Fig. 1 is a diagram showing the relationships between the chosen reference axes in respect to the aircraft and the direction of the earth's magnetic field.

The total induced magnetic field due to all soft magnetic parts of an aircraft structure may be reproduced by a system of three suitable virtual bars oriented in chosen directions in respect to the aircraft. Referring to Fig. 1, the aircraft is shown at the origin of a coordinate system in which the $x$, $y$ and $z$ axes are parallel respectively to the transverse, longitudinal and vertical axes of the aircraft. The three virtual bars mentioned above may be chosen in such fashion that one of them is parallel to each of these reference axes, the bar parallel to the $x$ axis being designated the transverse bar, that parallel to the $y$ axis being designated the longitudinal bar, and that parallel to the $z$ axis being designated the vertical bar.

Since the three virtual bars just defined do not in general lie on the reference axes, but are only parallel to them, each of them may under these circumstances itself produce magnetic field components along the other reference axes. These components must also be compensated if proper overall compensation is to be obtained. It is convenient to introduce a nomenclature in accordance with which the direction of the bar causing a field component as well as the direction of the component caused by that bar may be designated. Accordingly, a double-letter system is used in which the first letter indicates the orientation of the bar causing the field component and the second letter indicates the direction of the component caused thereby. Thus the transverse bar which produces components in the transverse, longitudinal and vertical directions may result in components designated as TT, TL and TV. Similarly, there will be other components designated LL, LV, LT, VV, VL and VT. The components acting along each of the three reference axes have been indicated in Fig. 1.

The nature of each of the virtual bars required to produce the induced field of the aircraft depends upon the size, distribution and other characteristics of the soft magnetic members which produce the total induced magnetic field, and the total field induced in them depends upon the relative orientation of the bars and the earth's magnetic field. Consequently, it is convenient to introduce direction angles X, Y and Z which measure respectively the orientations of the $x$, $y$ and $z$ axes in relation to the direction of the earth's magnetic field shown in Fig. 1 by the heavy arrow designated H.

The total induced magnetic field $H_I$ of the aircraft is then equal to the sum of the fields induced in the three virtual bars and may be written $$\overline{H}_I = H \begin{Bmatrix} (TT\cos X + LT\cos Y + VT\cos Z)i \\ (TL\cos X + LL\cos Y + VL\cos Z)j \\ (TV\cos X + LV\cos Y + VV\cos Z)k \end{Bmatrix} \quad (1)$$

where $i$, $j$ and $k$ are the unit vectors along the $x$, $y$ and $z$ axes, respectively.

Of the total induced field, only the component in the direction of the earth's magnetic field affects the operation of a magnetometer arranged to measure components in the direction of the earth's magnetic field. Resolving the field of Equation 1 in the direction of the earth's magnetic field results in an expression of the following form:

$$H_{ID} = H_E \begin{Bmatrix} (TT\cos^2 X + (TL+LT)\cos X \cos Y+) \\ ((VT+TV)\cos X \cos Z + LL\cos^2 Y+) \\ ((LV+VL)\cos Y \cos Z + VV\cos^2 Z) \end{Bmatrix} \quad (2)$$

Each term on the right-hand side of Equation 2 represents a component of induced field acting in the direction of the earth's magnetic field which must be compensated if satisfactory operation of the magnetometer is to be obtained. In each of these terms, the double-letter coefficient (TT, VV, etc.) is a constant which is determined by the structural characteristics of the aircraft and by which the magnitude of the earth's field must be multiplied to give the magnitude of the particular component, while the trigonometric argument in each case indicates the manner in which this amplitude varies as the aircraft maneuvers.

In the compensation method of the present invention, the aircraft is required to perform several maneuvers as a result of each of which an identifiable contribution to the output of the magnetometer installed in the aircraft is known to be due to components of the induced magnetic filed represented by individual terms of Equation 2. It will be recognized, however, that angles X, Y and Z, appearing in Equations 1 and 2, do not represent the maneuver angles of the aircraft and that a maneuver such as a pitch or roll produces something other than a simple variation in these angles. Additional information as to the manner in which the various induced magnetic field components vary as the aircraft maneuvers may be obtained by expressing the cosines of angles X, Y and Z in terms of the actual maneuver angles. Thus, referring to Fig. 1, let $\theta$ represent the heading of the aircraft measured from north. Similarly let $\phi$ represent the dip angle of the earth's magnetic field, $\psi$ the angle of roll of the aircraft about its longitudinal axis, and $\lambda$ the angle of pitch, these angles being measured from the horizontal plane.

Writing the cosines of angles X, Y and Z in terms of the angles just defined, we find that for rolls $$\begin{aligned} \cos X &= \cos\phi\sin\theta\cos\psi + \sin\psi\sin\phi \\ \cos Y &= \cos\phi\cos\theta \\ \cos Z &= \sin\phi\cos\psi - \cos\phi\sin\theta\sin\psi \end{aligned} \quad (3)$$

while for pitches $$\begin{aligned} \cos X &= \cos\phi\sin\theta \\ \cos Y &= \cos\phi\cos\theta\cos\lambda + \sin\theta\sin\lambda \\ \cos Z &= \sin\phi\cos\lambda - \cos\phi\cos\theta\sin\lambda \end{aligned} \quad (4)$$

As pointed out above, the aircraft is maneuvered in such fashion that the contribution of one or more identifiable components to the output of the magnetometer may be determined. Conveniently, the maneuvers may be pitches or rolls and may be made sinusoidally to assist in such determinations. In this case, $$\begin{aligned} \lambda &= a\sin\omega t \\ \psi &= b\sin\omega t \end{aligned} \quad (5)$$

where $a$ is the pitch amplitude and $b$ is the roll amplitude. Using a series expansion to find the sine and cosine of the angles $\lambda$ and $\psi$, one obtains $$\begin{aligned} \sin\lambda &= a\sin\omega t \\ \cos\lambda &= \left(1-\frac{a^2}{4}\right) + \frac{a^2}{4}\cos 2\omega t \end{aligned} \quad (6)$$

$$\begin{aligned} \sin\psi &= b\sin\omega t \\ \cos\psi &= \left(1-\frac{b^2}{4}\right) + \frac{b^2}{4}\cos 2\omega t \end{aligned} \quad (7)$$

these expressions being sufficiently accurate for maneuver angles up to 45 degrees.

Substituting Equations 6 and 7 in the expressions for the cosines of angles X, Y and Z of Equations 3 and 4, we obtain equations of the form $$\cos^2 X = k + A\sin\omega t + B\cos 2\omega t \quad (8)$$

these equations containing a constant term, a term in the fundamental of the maneuver frequency and a second-harmonic term. The constant term is not a function of time and does not contribute to the output of the magnetometer for the maneuver. Ordinarily, the second-harmonic term is relatively small in respect to the fundamental term and does not add appreciably to the induced magnetic field contribution in the direction of the magnetometer.

Accordingly, to a good approximation, the following relations hold for rolls:

$$\begin{aligned} \cos^2 X &= b\sin 2\phi \sin\theta \\ \cos^2 Y &= 0 \\ \cos^2 Z &= -b\sin 2\phi \sin\theta \\ \cos X \cos Y &= \frac{b\sin 2\phi \cos\theta}{2} \\ \cos X \cos Z &= -b(\cos^2\phi \sin^2\theta - \sin^2\phi) \\ \cos Y \cos Z &= -\frac{b\cos^2\phi \sin 2\theta}{2} \end{aligned} \quad (9)$$

while for pitches:

$$\begin{aligned} \cos^2 X &= 0 \\ \cos^2 Y &= a\sin 2\phi \cos\theta \\ \cos^2 Z &= -a\sin 2\phi \cos\theta \\ \cos X \cos Y &= \frac{a}{2}\sin 2\phi \sin\theta \\ \cos X \cos Z &= -\frac{a}{2}\cos^2\phi \sin 2\theta \\ \cos X \cos Z &= -a(\cos^2\phi \cos^2\theta - \sin^2\theta) \end{aligned} \quad (10)$$

Referring to Equation 2 and substituting therein the expressions of Equations 9 and 10, it will be seen that the arguments of the TT and VV terms of Equation 2 are equal and opposite for roll maneuvers. Similarly the arguments of LL and VV are equal and opposite for pitch maneuvers. Consequently, satisfactory compensation of the TT, LL and VV terms may be obtained if the algebraic sum of TT and VV and the algebraic sum of LL and VV are made zero, it being unnecessary to make these terms individually zero. Thus it will be understood that complete compensation of components of the induced field in the direction of the earth's magnetic field may be effected if the following equations are satisfied:

$$(TT-VV)=0 \quad (11)$$
$$(LL-VV)=0 \quad (12)$$
$$(TL+LT)=0 \quad (13)$$
$$(TV+VT)=0 \quad (14)$$
$$(LV+VL)=0 \quad (15)$$

It will be seen that in each case it is necessary only to vary one of the two terms in each of Equations 11, 12, 13, 14 and 15 in order to satisfy them, and that therefore means are required for producing individual magnetic fields proportional to only five quantities, namely ($\cos^2 X$), ($\cos X \cos Y$), ($\cos X \cos Z$), ($\cos Y \cos Z$) and ($\cos^2 Y$).

Figure 2:
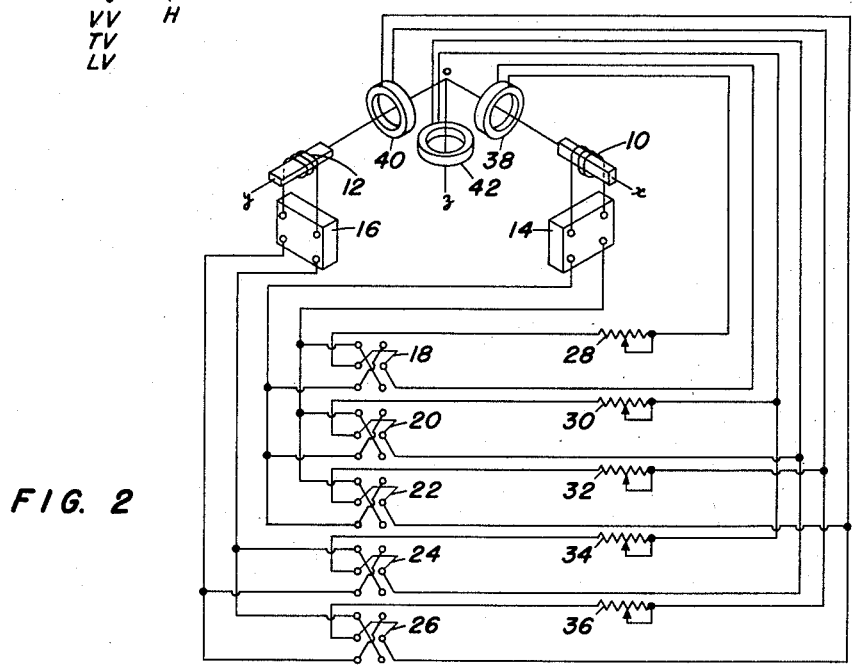
Fig. 2 is a schematic diagram of a compensation system according to the invention.
Figure 3:
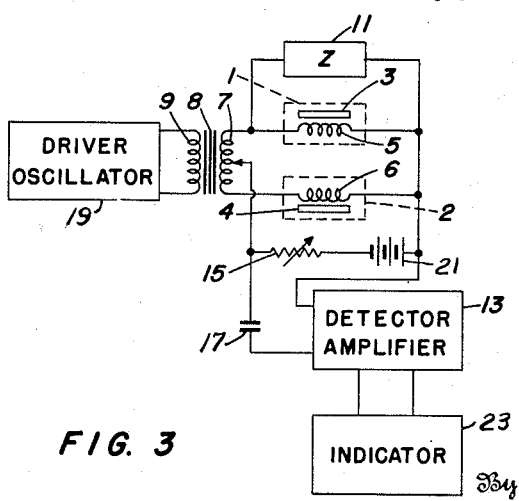
Fig. 3 is a schematic diagram, partly in block form, of an unbalanced magnetometer circuit which may be used in the above system.

Accordingly there is provided the compensating device illustrated in Fig. 2 of the drawings. Magnetometers are arranged to measure the components of the earth's magnetic field along the transverse and longitudinal axes of the aircraft. Conveniently, these magnetometers may be of the general type disclosed in copending application Serial No. 516,612, filed January 1, 1944, Unbalanced Magnetometers, Otto H. Schmitt, now Patent No. 2,560,132, dated July 10, 1951, and may comprise in each case a set of magnetometer elements 1 and 2, as shown in Fig. 3, and a detector-amplifier 13 arranged to produce an output voltage varying in accordance with variations in the magnetic field in the direction of the axes of the elements 1 and 2. The pair of substantially identical magnetometer elements 1 and 2 each have a magnetic core and a winding. These magnetometer elements are disposed with their magnetic axes substantially parallel, and the windings 5 and 6 are so connected that similar poles of the cores 3 and 4 are oppositely directed. There is thus provided a bridge circuit having output terminals and including the windings 5 and 6 and a source 7, 8, 9 and 19 of alternating driving voltage, together with an impedance 11 in the leg of the bridge circuit which includes one of the windings (5). The battery 21 is used in connection with potentiometer 15 to saturate core 4, and condenser 17 is used to isolate the battery current from the output signal. As a result, the output signal appearing at the output terminals connected to the detector-amplifier 13 comprises a series of pulses of alternate polarity whose difference in magnitude is dependent upon the magnetic field surrounding the magnetometer elements, such as the earth's magnetic field, the magnitude of the individual peaks being dependent upon the value of the impedance. The output from the detector amplifier 13 may be supplied to an indicator 23. Thus, in Fig. 2, magnetometer elements 10 and 12 and associated detector-amplifiers 14 and 16 are arranged respectively to measure the components of the earth's magnetic field along the transverse and longitudinal axes of the aircraft. Preferably the latitude of the magnetometers is increased by any suitable means, as for example through the use of short strips in the magnetometer elements, to give an output voltage which varies linearly with the field strength in the measured direction over the maximum possible range of variation.

The output voltages of detector-amplifiers 14 and 16 are fed through reversing switches 18, 20 and 22, and 24 and 26, respectively, to a high-impedance mixer comprising potentiometers 28, 30, 32, 34 and 36 and arranged to produce independently adjustable currents proportional to each of the output voltages in each of compensating coils 38, 40 and 42, mounted in the aircraft in such fashion that the magnetic fields produced thereby lie respectively along the transverse, longitudinal and vertical axes.

Considering the operation of the device just described, it will be seen that the output of detector-amplifier 14 is proportional to ($H \cos X$), while that of detector-amplifier 16 is proportional to ($H \cos Y$). Thus there may be produced in each of coils 38, 40 and 42 a current causing a field proportional to ($H \cos X$), and in each of coils 40 and 42 a current causing a field proportional to ($H \cos Y$). Coil 38 produces a field proportional to ($H \cos X$) along the transverse axis, coil 40 produces a field proportional to ($H \cos X$) and ($H \cos Y$) along the longitudinal axis, and coil 42 produces a field proportional to ($H \cos X$) and ($H \cos Y$) along the vertical axis.

When these fields are resolved in the direction of the earth's magnetic field, it is seen that the contribution from coil 38 is proportional to ($H \cos^2 X$), that from coil 40 is proportional to ($H \cos X \cos Y + H \cos^2 Y$), while that from coil 42 is proportional to ($H \cos X \cos Z$) and ($H \cos Y \cos Z$).

Referring again to Equation 2, it will be seen that the compensating device provides means for producing field terms of the same form as each of those causing the disturbing field in the direction of the earth's magnetic field. Consequently, if the polarities of the currents applied to compensating coils 38, 40 and 42 are chosen appropriately and the settings of potentiometers 28, 30, 32, 34 and 36 are made proportional to coefficients ($TT-VV$), ($TL+LT$), etc., the fields may be exactly compensated.

The exact compensation procedure which enables one to make suitable adjustments of the potentiometers of the compensation device arises from a consideration of Equation 9 and 10. Thus the aircraft is first rolled harmonically on a north heading through an angle $\psi$ and the output of the magnetometer with which the aircraft is equipped is noted. This signal is proportional to $[(TL+LT)-(TV+VT)]$. The aircraft is then rolled through the same angle on a south heading and the magnetometer output is again noted, the signal in this case being proportional to $[(TL+LT)+(TV+VT)]$. Rolls on north and south headings are continued and potentiometer 30 is adjusted until the magnetometer output has the same magnitude and polarity for the two maneuvers. A consideration of the terms involved in these maneuvers indicates that since the ($TV+VT$) changes sign, it is effectively reduced to zero by the procedure just described.

The above procedure having been carried out, the aircraft is rolled harmonically on a north or south heading and potentiometer 32 is adjusted until the magnetometer output, which is proportional to ($TL+LT$), is reduced to zero. At this point Equations 13 and 14 have been satisfied.

Next the aircraft is rolled harmonically on an east heading producing a magnetometer output proportional to ($TT-VV$), the other terms to be expected from a consideration of Equations 9 and 10 having been already rendered equal to zero by the procedure just described. Accordingly the output of the magnetometer is again made zero by adjusting potentiometer 28, which enables one to adjust the TT term until the coefficient ($TT-VV$) is equal to zero.

These two steps having been accomplished, the aircraft is next rolled harmonically on a northeast heading, producing a magnetometer output proportional to ($LV+VL$). The maneuver is continued and the output is reduced to a minimum using potentiometer 34 which adjusts LV. The coefficient ($LV+VL$) is thus made zero and the only remaining disturbing component is that having the coefficient $(LL-VV)$.

To compensate this last component, the aircraft is pitched harmonically on a north heading producing, as indicated by Equations 10, a signal proportional only to $(LL-VV)$, all other components having previously been compensated. Potentiometer 36 is thus adjusted as in the previous cases until the magnetometer output becomes a minimum indicating that $(LL-VV)$ is substantially zero.

The aircraft is then substantially completely compensated for induced magnetic fields acting in the direction of the earth's magnetic field and this may be checked by executing any desired maneuvers, as for example circles, clover-leaf turns or the like, and observing the output of the magnetometer with which the aircraft is equipped.

The precision with which compensation of the various components may be effected varies with the dip angle of the earth's magnetic field. Ideally the procedure outlined above, therefore, should be repeated at two geographical locations at which the dip angle differs by a considerable amount, although satisfactory compensation has been obtained through use of the procedure at a single location.

It will be understood that, compensation having once been accomplished as described above, the compensating device may be replaced with strips of Permalloy or other soft magnetic materials oriented in the same fashion as compensating coils 38, 40 and 42 and of size determined by the amplitudes of compensating currents which were required in the coils of the compensating device.

Having thus described my invention, what I claim is:

1. An induced magnetic field compensator for aircraft equipped with magnetometers arranged to measure field components in the direction of the earth's magnetic field, which comprises a pair of magnetometer means for measuring components of the earth's magnetic field in two mutually perpendicular directions in respect to the aircraft and producing voltages proportional to said field components in said directions, first and second coils for generating magnetic fields in each of said directions when excited, a third coil for producing magnetic fields in a direction normal to each of said directions when excited, and polarity reversing and magnitude varying means connecting the output from said magnetometer means to said coils for exciting said coils, the output from one of said magnetometer means being supplied in adjustable polarity and magnitude, through said polarity reversing and magnitude varying means, individually to each of said coils, and the output from the other of said magnetometer means being supplied in adjustable polarity and magnitude, through said polarity reversing and magnitude varying means, individually to said first and third coils.

2. An induced magnetic field compensator for aircraft equipped with magnetometers arranged to measure field components in the direction of the earth's magnetic field, which comprises magnetometers for measuring components of the earth's magnetic field in two mutually perpendicular directions in respect to the aircraft and for producing voltages proportional to field components in said directions, first and second coils for generating magnetic fields in each of said directions, a third coil for producing magnetic fields in a direction normal to each of said directions, and polarity reversing and magnitude varying means connecting the output from said magnetometers to said coils, the output from one of said magnetometers being supplied through said last named means, in adjustable polarity and magnitude, individually to each of said coils and the output from the other of said magnetometers being supplied through said last named means, in adjustable polarity and magnitude, individually to said first and third coils.

References Cited in the file of this patent
UNITED STATES PATENTS

| 41,839 | Gisborne | Mar. 8, 1864 |
| 1,596,639 | Vion | Aug. 17, 1926 |
| 1,892,826 | Bettison et al. | Jan. 3, 1933 |
| 2,151,627 | Vacquier | Mar. 21, 1939 |
| 2,252,059 | Barth | Aug. 12, 1941 |
| 2,324,718 | Noxon | July 20, 1943 |
| 2,420,580 | Antes | May 13, 1947 |
| 2,468,554 | Hull | Apr. 26, 1949 |

FOREIGN PATENTS

| 592,801 | Germany | Feb. 15, 1934 |
| 666,594 | Germany | Oct. 24, 1938 |

OTHER REFERENCES

Electricity and Magnetism, by S. G. Starlin; Longmans, Green and Co. Ltd., London; 1929; pages 45-50.